Patented Mar. 16, 1943

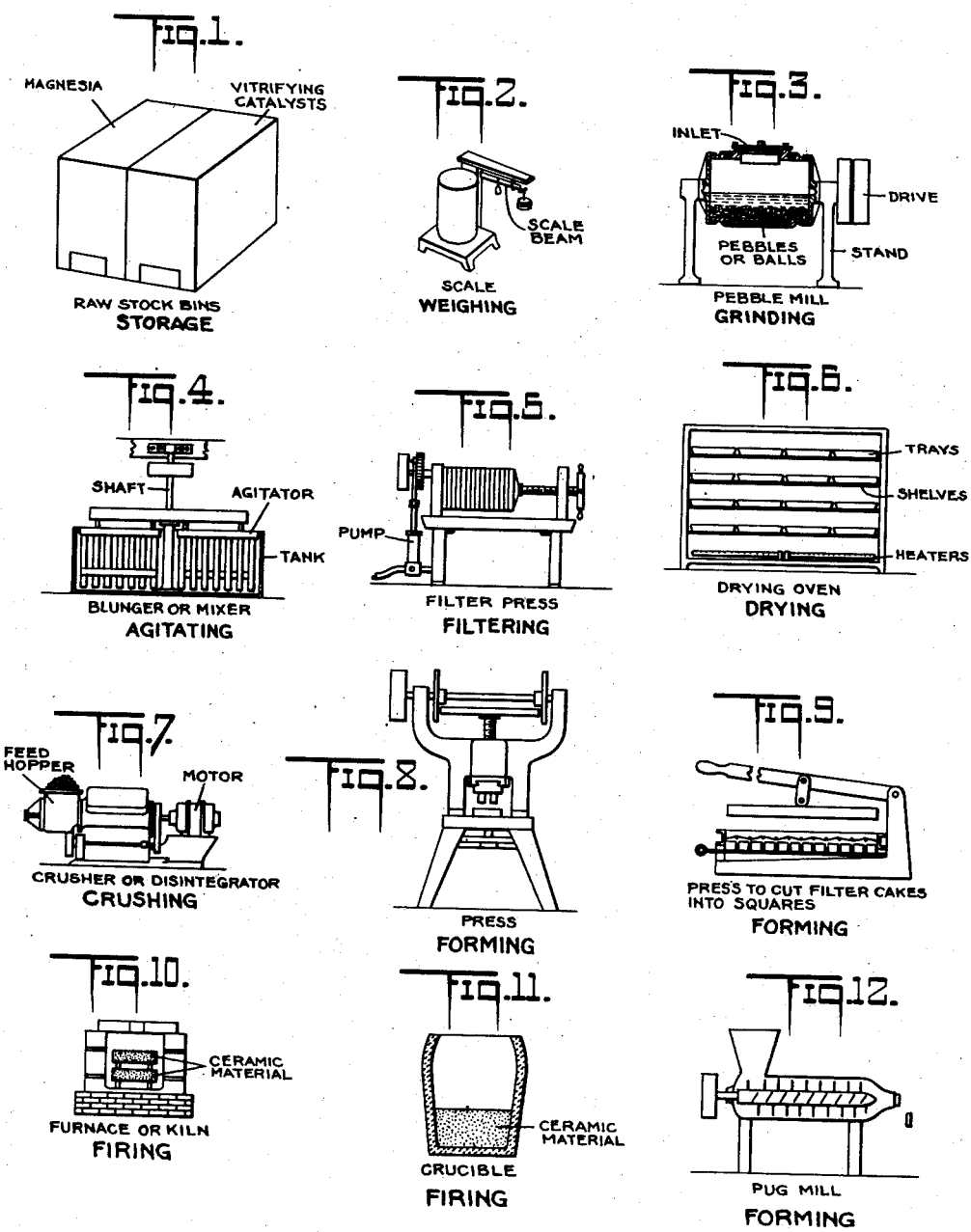

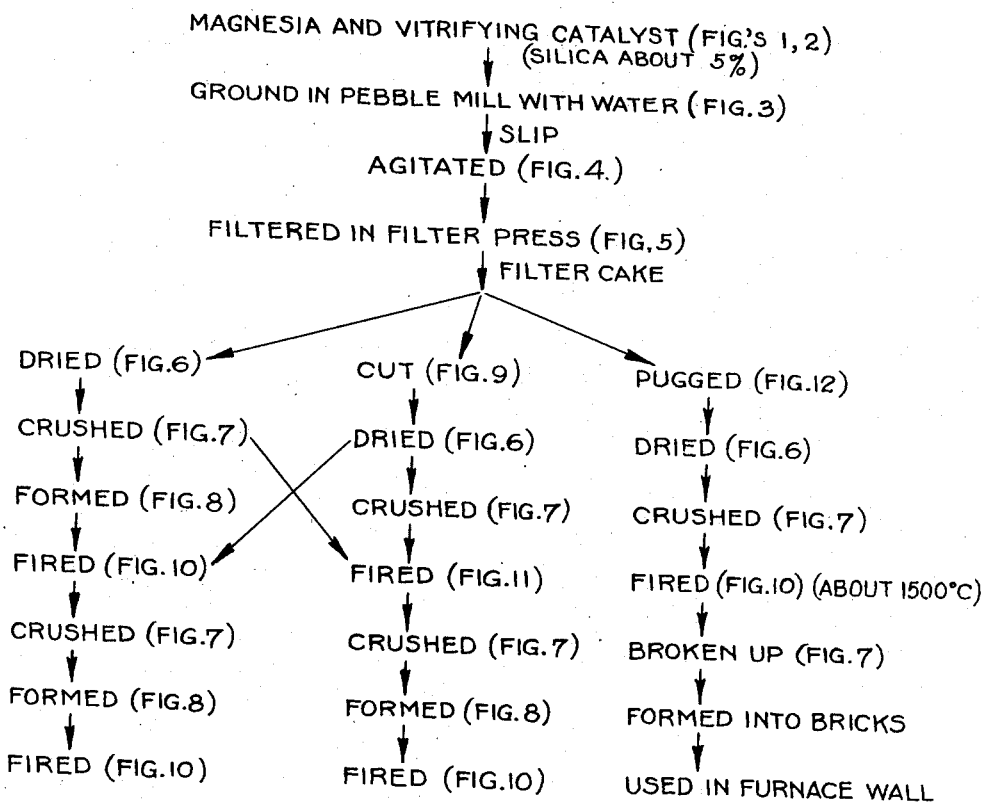

2,313,746

UNITED STATES PATENT OFFICE 2,313,746

PROCESS OF MAKING MAGNESIA CERAMICS

John Allen Heany, New Haven, Conn., assignor to Heany Industrial Ceramic Corporation, Rochester, N. Y.

Application October 16, 1937, Serial No. 169,354

15 Claims. (Cl. 25—156)

The present invention relates to the production of ceramics from magnesia.

In making ceramics from magnesia, it has been found possible to produce dense, vitreous products by properly activating the finely divided magnesia mixture, followed by molding, slip casting, or extrusion of the activated mixture and firing the formed article at a temperature substantially below its fusion point and preferably above 1000° C. and desirably about 1400° C. to 1600° C. However, the difficulty has often been experienced that a substantial amount of shrinkage takes place, ranging from 10% to sometimes as high as 50% or more, so that the articles or shapes will become distorted during the firing operation and will shrink unevenly, with the result that the articles produced are of inferior quality.

It is therefore among the objects of the present invention to provide improved magnesia ceramics and processes of forming and firing the same which will eliminate said excessive shrinkage or accommodate such shrinkage without distortion or injury to the quality of the final material.

A further object is to provide a magnesia ceramic and processes of preparing the same by which it will be possible to produce the ceramic either in the form of a dense, non-porous, vitreous mass or in the form of a less dense mass by controlling the forming and firing operations, and without substantial difficulty due to excessive shrinkage.

Another object of the present invention is to provide divided magnesia ceramic materials, and particularly finely divided magnesia, having self-bonding properties, which may be formed and fired without binders or with only temporary binders, and which may also be used as a bond or binder for other materials.

Other objects will be obvious or will appear during the course of the following specification.

According to the preferred procedure of the present invention, it has been found that magnesium oxide (MgO) in altogether dehydrated condition or containing small amounts of water or small amounts of magnesium hydroxide or carbonate ($MgO.nH_2O$) or ($MgO.xH_2O.yCO_2$) may be activated by finely dividing the same, preferably in the presence of water or a weakly alkaline aqueous environment to a fineness of substantially less than 200 mesh and to a state of fineness wherein the average size of the particles will be substantially less than 30 to 40 microns. In the preferred composition the grinding is preferably carried out so that 80% to 90% of the magnesium oxide material has a fineness of less than 20 microns, and at all times a major portion of the magnesium oxide material should fall within the range of between 2 to 25 microns.

If desired, magnesium oxide derived by the calcination of magnesite and/or dolomite may serve as the source of the magnesium oxide, although it is generally preferable to utilize a relatively pure dehydrated precipitated magnesium hydroxide. Preferably the magnesium oxide before being ground in the presence of water should have been converted from its original pasty or gelatinous condition into the form of a relatively firm, coarse powder which may contain small quantities of water or magnesium hydroxide.

The grinding of the magnesium oxide may be carried out in a pebble mill, desirably with flint pebbles and a flint lining, or in a ball mill in the presence of aqueous 1% to 5% solutions of sodium or potassium carbonate or sodium or potassium hydroxide, and preferably the amount of solution present should be from 2 to 10 times by weight the amount of magnesium oxide present.

If desired, the grinding of the magnesium oxide may take place in several stages with a dry grinding operation preceding the wet grinding, and the magnesium oxide may be first partly reduced to its desired state of fineness by dry grinding and then finally reduced by the wet grinding operation. Although grinding to a state of fineness is a preferred way of activating the magnesium oxide for ceramic purposes, it is also possible, in combination with this process or in lieu thereof, to include certain vitrification catalysts, such as acid oxides preferably of a nature which will not fuse at a firing temperature of 1000° C. to 1500° C.

Although the preferred non-metallic oxide is silica, especially in finely divided form, it is also possible to include other acid oxides, such as boron oxide and so forth. The finely divided silica may be mixed in with the finely divided magnesia after the grinding has been completed, but it is preferably incorporated with the magnesium oxide before the grinding of such oxide has been commenced or after the grinding has been partially completed, so that the silica will be ground in with the magnesia to substantially the same degree of fineness.

In any case, the grinding, with or without the addition of silica, should be continued until the magnesium oxide appears to become partly hydrated or appears to acquire the character of a permanent suspensoid.

As a typical mixture which is produced as a result of this grinding process, the following may be given:

Particle size in microns: Per cent of particles finer
| | |
|---|---|
| 35 | 95 |
| 21 | 94 |
| 16 | 93 |
| 11 | 92 |
| 9 | 91 |
| 6.5 | 91 |
| 4.5 | 88 |
| 3.3 | 81 |
| 2.7 | 74 |
| 2.2 | 64 |
| 1.9 | 57 |
| 1.1 | 36 |
| 0.8 | 24 |

Specific gravity 3.50

In wet grinding or colloidizing the magnesia in a flint-lined pebble mill with flint pebbles, the grinding should be carried out under such conditions that the magnesia will not take up more than about ¼% to ¾% of silica from the mill. It is generally desirable to use about 25% of the magnesia composition and about 75% water to make the grinding slip.

The time of grinding is dependent upon the size of pebble mill, the size of pebbles, quantity used and the speed of the mill. With a small mill, one gallon size, good results are obtained with fifty hours grinding, the weight of the charge being one kilogram of magnesia composition and three kilograms of water, and the mill being about one-half full of pebbles of approximately ¾" diameter. The larger the mill the less grinding time required, due to the greater action of the pebbles. The time of grinding, however, may be varied from ten to sixty hours, and the amount of water from 35% to 85% of the mix in the pebble mill.

The material, after grinding, may be treated in a thickener or it may be agitated in a blunger. It may also be settled to segregate magnesia of different particle size and the sediment may be dried. Preferably, however, the slip or slurry of magnesia is partly dehydrated by filter pressing. The filter cake which is formed should preferably not contain more than about 5% to 10% of water, and it may be dried at a temperature not substantially exceeding about 200° C., and at the most not exceeding 500° C. to 600° C., to reduce the filter cake to a water content of about 1% to 2%.

The dried filter cake, which after drying is relatively shrunken and dense, may be moistened or dampened, if desired, to break it up into a large number of small blocks or particles, which blocks or particles, with or without crushing and/or grinding, may be fired at a temperature from 1000° C. to 1500° C. to permit of shrinkage.

If desired, the damp material obtained from the pebble mill or as a result of filter pressing may be formed into blocks or bricks or may be slip-cast in various forms and dried and fired in this formed condition without the pulverizing or grinding operation.

It is also possible to take the dried filter cake and fire it as such at a temperature from 1000° C. to 1500° C. for several hours. During this firing operation the magnesium oxide mass will shrink from 50% to 80% in volume and will be converted into a strong, vitreous, non-porous or cellular material, depending upon the firing conditions and the exact character of the raw material. Usually the material is of amorphous nature, is non-crystalline and will give a conchoidal fracture if broken.

Although the material produced after the first firing operation may be used for many purposes where large shrinkages are not objectionable, it is usually most desirable to grind or crush this fired material by dry grinding or wet grinding operations, with or without the incorporation of activating oxides such as silica, to produce a fineness of sub-division below 100 microns and preferably from 5 to 50 microns. Where the grinding of the fired material is carried out in the dry, the final material should also pass a 300 mesh screen and preferably a 400 mesh screen, and where the grinding is carried out in a dry pebble mill a major portion, preferably up to 80% to 90% of the material, should have a fineness of less than 20 to 30 microns.

In many instances it is preferred to omit the silica or other activating oxide in the first firing operation and to include it with the second mixture during the grinding operation or by intermixture with the ground material. The ground material thus produced, in damp or dry condition, with or without filter pressing, may be formed into articles by extrusion, slip-casting, molding, pressing, plugging and so forth, which articles then may be dried and fired with very little shrinkage to produce ceramic articles and shapes of various sizes and of high quality.

Although bonding agents such as cellulose compounds, dextrin gums or resins may be employed in the forming operation, it has been found that the activated magnesium oxide may be readily formed and fired without any bonding agents or with only a temporary binder, since it appears to have self-bonding properties. The self-bonding properties of the fired and ground magnesia is also affected by the fineness of subdivision, and it has been found that the self-bonding properties are improved with a fineness of division of less than 200 mesh.

The porosity or non-porosity or cellular structure of the final material is determined largely by the size of the particles which are included in the formed material after the first firing operation. If the particles are of larger size than 400 mesh or above 100 to 200 microns, the material tends to assume a porous or cellular structure, whereas if they are less than 50 microns or finer than 400 mesh the material tends to assume a dense, non-porous, vitreous, amorphous structure in which the density of the ceramic is usually about 3, and frequently between 3.5 to 4.5.

In firing the material, ordinary fuel-fired kilns or furnaces may be employed with temperatures of about 1200° C. to 1600° C., as compared with the usual temperatures utilized in connection with magnesia ceramics of 2800° C. to 3000° C.

The material resulting after the first firing operation may be conveniently employed or formed into articles such as bricks, furnace linings, pyrometer tubes, or be utilized directly as a heat insulating material. Instead of firing the initial finely divided, dried material in a fuel-fired furnace, it is also possible to fire it in a crucible or sagger without forming it, with the result that the initial material will shrink or conglomerate into a cake or ingot which will take the form of the receptacle in which it has been placed. This ingot or cake resulting from the first firing operation will be found to be porous and readily disintegrated and the powdered or divided material obtained may be readily formed into an article for the second firing operation.

The prefired material after the second forming and firing operations will have been found to have a low shrinkage of less than 20%, and usually not more than 5% to 10%, and the magnesia ceramic so produced may be utilized for stoneware, refractory bricks, abrasives, nozzles for sand blasting, dies for wire drawing, crucibles, refractory vessels, tubing, translucent panels, pyrometer tubes, dies, furnace linings, muffles, combustion tubes, tiles, combustion boats, pebbles for pebble mills, non-slip treads, mortars and pestles, casseroles, spatulas, hearth plates, saggers, jaws for crushing apparatus, drills, chemical stoneware, pottery, textile guides, electric furnace cores, bearings for clocks and instruments, linings for ball and pebble mills, and so forth.

The firing operation may be carried out in an oxidizing atmosphere containing air, in a neutral atmosphere containing waste combustion gases, or in a reducing atmosphere containing substantial quantities of hydrogen and carbon monoxide or other reducing gases. Firing in an oxidizing atmosphere will give a harder ceramic than firing in a reducing atmosphere, while firing in a reducing atmosphere will give a harder ceramic than firing in a neutral atmosphere.

If desired, the final firing operation at 1450° C. to 1500° C. may be performed in a reducing atmosphere of combustion gas containing carbon monoxide formed in the kiln during firing or cooling, or preferably during both firing and cooling. Colored effects may also be obtained by incorporating iron, vanadium, chromium or manganese compounds in the magnesia before or after wet grinding these compounds, preferably being in at the same time as the silica and in amounts never exceeding a few percent.

Before the firing operation it is most important that the plastic material contain not more than about 5% to 8% of water, and the formed material may be pre-dried if desired.

If it is desired to make small particles, the hot disks or blocks of the ceramic from the furnace or kiln after firing, or produced by reheating the cooled articles to a red heat, may be suddenly cooled or be dumped directly into water with the result that the block or disk of material will crack or fissure and may be readily broken up into a large number of granules or grains having very sharp edges and of particularly satisfactory properties.

In the above procedure, it is also possible to dampen the dried filter cake, which may then be broken up into pieces, and these pieces may then be directly fired in the kiln or furnace at a temperature of between 1000° C. to 1500° C. to give a granular ceramic.

The self-bonding properties of the magnesia resulting from the first firing operation may be taken advantage of by crushing or grinding the mass resulting from the first firing operation, forming it with a temporary binder and then utilizing it in some connection where it will be subjected to such heat that the temporary binder will be destroyed, leaving the magnesia particles or granules in contact with each other, whereupon they will bond together to form a ceramic article of substantial strength and density.

For example, in forming magnesia bricks, the vitreous-like ground pieces or granules resulting from the first firing operation are pressed into a rectangular form with or without a temporary binder, such as a gum or resin. The formed article may be directly utilized as a furnace lining without further firing, and when the furnace is raised to temperature the temporary binder is destroyed and the particles composing the brick will bond themselves together to form a strong, sintered mass. This action is due to the self-bonding properties of the magnesia, and it is particularly apparent when a small amount of an oxide, such as silica, has been included in the magnesia mass before the first firing operation.

Bricks, tubes, crucibles, and other articles may also be made by grinding and molding the magnesia formed from the first firing operation with or without a temporary binder. The ground material resulting from the first firing operation may be conveniently formed into articles by dry pressing, slip casting, pugging, and in any manners to form self-bonding magnesia articles.

The ground or disintegrated magnesia resulting from the first firing operation may also be utilized as a refractory cement to bind together various refractories, masses or articles, particularly in connection with furnace linings or in other places where high heats are produced, since the magnesia, which has been so prefired and ground, will not only bond itself together but will also bind other particles of refractories together to form relatively strong, coherent, dense masses.

In the accompanying drawings are shown various forms of apparatus which may be utilized in connection with the forming of magnesia ceramics according to the present invention.

Fig. 1 shows bins for holding the raw materials, namely, the magnesia and silica;

Fig. 2 diagrammatically represents a weighing scale for weighing out exact proportions of magnesia and a catalyst;

Fig. 3 is a pebble or ball mill in which the magnesia and catalyst may be ground with water and preferably flint balls to form a slip;

Fig. 4 is an agitator or blunger into which the ground material or slip is permitted to flow from the pebble or ball mill;

Fig. 5 diagrammatically indicates a filter press in which the material from the blunger is filtered;

Fig. 6 represents a drying oven which may be utilized to dry the filter cake from Fig. 5;

Fig. 7 is a crusher or disintegrator which may be utilized to crush the dried material from Fig. 6;

Fig. 8 is a press which may be employed to form or mold the crushed or ground material from Fig. 7;

Fig. 9 is a cutting apparatus which may be utilized to cut the filter cakes from Fig. 5 before they are dried in Fig. 6;

Fig. 10 is a furnace or kiln which may be employed for firing the dried material from Fig. 6 or the molded material from Fig. 8;

Fig. 11 is a crucible which may be utilized for firing crushed material from the crusher of Fig. 7;

Fig. 12 diagrammatically represents a pug mill which may be utilized for forming the wet filter cake from Fig. 5 or the pieces thereof from the apparatus of Fig. 9, the material from the pug mill of Fig. 12 preferably being fired in the furnace of Fig. 10 or the crucible of Fig. 11; and Fig. 13 is a diagrammatic flow sheet.

In forming the magnesia ceramic materials according to the present invention, the magnesia in dehydrated condition, and preferably in more or less divided condition and containing, if desired, small quantities of magnesium hydroxide or hydrated magnesium carbonate and, if desired, other alkali earth metal or alkali metal oxides, hydroxides or carbonates, is taken from the storage bins of Fig. 1 and carefully weighed out into the flint-lined pebble mill or ball mill of Fig. 3 by the scale of Fig. 2. The vitrifying catalyst or silica is also carefully weighed out and added to the pebble mill of Fig. 3, the proportion of silica being between 1% to 20% and preferably about 2% to 5% of the amount of magnesia.

This mass is then ground in the ball mill of Fig. 3 for 1 to 4 hours, or sometimes for several days, with an amount of water from one to ten times the weight of the magnesia and, if desired, with the addition of small amounts of alkali metal compounds such as the carbonate of hydroxide, preferably in quantities not greater than 1% to 5%.

The material from the mill of Fig. 3 is then permitted to flow after grinding into the agitating device of Fig. 4, where it is maintained in suspension until it is pumped into the filter press of Fig. 5. Instead of filter pressing, the material may be permitted to settle to form a plastic mass which may then be handled before or after drying to form the final ceramic material.

The wet filter cake may then be dried in Fig. 6, may be cut in the press of Fig. 9, or may be pugged in the pug mill of Fig. 12.

The dried filter cake is then preferably crushed in the crusher of Fig. 7 and the crushed material formed in the press of Fig. 8. The molded or formed material may then be fired in the furnace of Fig. 10 at a temperature of 1000° C. to 1500° C.

If desired, however, the wet material from Fig. 5, with or without a slight amount of drying to reduce its water content to 1% to 5%, and with or without the cutting and pugging operations illustrated in Figs. 9 and 12, may be molded directly in wet condition or mixed with water and slip cast in a porous vessel.

After drying, the material, instead of being formed, may also be fired in a crucible as shown in Fig. 11 in which it may be conglomerated.

Upon firing the material will usually shrink over 50%, and it is usually desirable to crush the material after the firing operation in the crusher of Fig. 7, following which it may be molded into bricks and then utilized directly in a furnace lining, or it may again be formed by molding in the dry or with a binder, slip casting, extrusion, pugging, and so forth.

The properties of the final ceramic will depend largely upon the fineness of grinding after the first firing operation, particles larger than 100 mesh producing a less dense final product than will finer particles of less than 200 mesh.

The present application is a continuation in part of application Serial No. 737,060, filed July 26, 1934, now Patent No. 2,095,982, and it is particularly directed to the two-step firing operation to avoid excessive shrinkage which is disclosed but not specifically claimed in said earlier application.

It is apparent that many changes could be effected in the processes and procedures above described, and in the specific details thereof, without substantially departing from the invention intended to be defined in the claims, the specific description herein merely serving to illustrate certain compositions by which, in one embodiment, the spirit of the invention may be effectuated.

What I claim is:

1. A method of forming dense, non-porous magnesia ceramics which comprises wet grinding the magnesia to a size of between 2 and 25 microns, forming and firing the ground magnesia, regrinding the fired product and then forming and firing the reground material.

2. A process of forming magnesia bricks which comprises grinding magnesia to colloidal size less than about 30 to 40 microns, forming and firing the ground magnesia, forming the ground material in the form of a brick, and then utilizing said brick directly in a furnace lining where it will be subjected to a relatively elevated temperature.

3. A process of forming and shaping dense, non-porous magnesia ceramics which comprises grinding magnesia and silica to colloidal size less than about 30 to 40 microns, forming and firing, disintegrating the fired material, and then forming the disintegrated material into a shape and again firing.

4. A process of making dense, non-porous magnesia ceramics which comprises grinding magnesia with a small amount of silica to colloidal size less than about 30 to 40 microns in a pebble mill, filtering the slip resulting therefrom, drying, crushing, molding, firing, recrushing, molding and firing.

5. A process of making dense, non-porous magnesia ceramics which comprises grinding magnesia and a small amount of silica in the presence of water to colloidal size less than about 30 to 40 microns, filtering, pugging the filter cake, drying, firing, crushing, forming and refiring.

6. A process of making dense, non-porous magnesia ceramics which comprises grinding the magnesia with a small amount of silica and water in a pebble mill for between about ten to sixty hours, filtering, crushing and firing the crushed mass in the crucible, recrushing, molding and firing, each firing taking place at a temperature ranging between about 1000 to 1600° F.

7. A process of making dense, non-porous magnesia ceramics which comprises calcining and then grinding, forming and firing the magnesia, crushing the fired mass and then again forming and firing.

8. A process of forming and shaping dense, non-porous magnesia bricks which comprises calcining and then grinding the magnesia with a small amount of silica, forming and firing the ground magnesia, recrushing the ground magnesia and then forming the bricks from the crushed mass.

9. A process of forming and shaping dense, non-porous magnesia bricks which comprises calcining and then grinding the magnesia with a small amount of silica, forming and firing the ground magnesia, recrushing the ground magnesia and then forming the bricks from the crushed mass with a temporary binder and then placing said bricks in a furnace where they will be subjected to an elevated temperature.

10. A process of making dense, non-porous magnesia ceramics which comprises colloidally grinding the magnesia to a size at least as small as about 30 to 40 microns, forming and firing the magnesia, crushing the fired mass with a small amount of silica, and then again forming and firing.

11. A process of forming and shaping articles of magnesia which comprises forming a mixture of magnesia and silica in a colloidal aqueous dispersion, the colloidal particles having a size at least about 30 to 40 microns, firing this mixture at about 1500° C., disintegrating the fired mixture, and pressing or forming into an article containing a temporary binder.

12. A process of forming and shaping relatively low density magnesia ceramic articles which comprises colloidally grinding to a size at least as small as about 30 to 40 microns, forming and firing magnesia oxide, crushing the fired mass into granules of relatively large size, and again forming and firing such granules.

13. A process of forming and shaping a dense, hard, vitrified, amorphous magnesia, which comprises providing a calcined magnesium oxide, grinding with water said magnesium oxide and a small amount of silica between 2 and 5% together until a colloidal dispersion is formed, the particles in said dispersion having a size at least as fine as 30 to 40 microns, removing the water from said colloidal dispersion and drying the residue, crushing the dried residue, forming and firing said residue at a temperature of between about 1000 to 1600° C., again crushing, forming and then again firing at about the same temperature.

14. A process of forming a dense, hard, vitreous, amorphous magnesia brick or similar magnesia article which comprises providing a substantially pure, dehydrated, precipitated magnesium hydroxide, mixing this magnesium hydroxide with between about 2% to 5% of silica and between 1% to 5% of an alkali metal compound, and placing the mixture in a pebble mill with flint pebbles and a flint lining with an amount of water equal to about one to ten times the weight of the magnesium hydroxide, grinding from ten to sixty hours until the magnesium hydroxide becomes additionally hydrated and tends to acquire the character of a permanent suspensoid, agitating the ground mixture and then filter pressing, drying the filter cake, crushing the dried filter cake, forming the crushed material to a desired shape and then firing said shape at a temperature of 1000° to 1500° C.

15. A process of forming a dense, hard, vitreous, amorphous magnesia brick or similar magnesia article which comprises providing a substantially pure, dehydrated, precipitated magnesium hydroxide, mixing this magnesium hydroxide with between about 2% to 5% of silica and between 1% and 5% of an alkali metal compound, and placing the mixture in a pebble mill with flint pebbles and a flint lining with an amount of water equal to about one to ten times the weight of the magnesium hydroxide, grinding from ten to sixty hours until the magnesium hydroxide becomes additionally hydrated and tends to acquire the character of a permanent suspensoid, agitating the ground mixture and then filter pressing, drying the filter cake, crushing the dried filter cake, firing the crushed material and then again crushing the fired material, forming the last mentioned crushed material and again firing to obtain a magnesia article.

JOHN ALLEN HEANY.